United States Patent
Zhou (10) Patent No.: US 11,700,034 B2
(45) Date of Patent: Jul. 11, 2023

(54) METHOD AND DEVICE FOR EXTRACTING BROADBAND ERROR CALIBRATION PARAMETERS AND COMPUTER-READABLE STORAGE MEDIUM

(71) Applicant: ZTE CORPORATION, Guangdong (CN)

(72) Inventor: Hongxing Zhou, Guangdong (CN)

(73) Assignee: ZTE CORPORATION, Guangdong (CN)

(*) Notice: Subject to any disclaimer, the term of this patent is extended or adjusted under 35 U.S.C. 154(b) by 80 days.

(21) Appl. No.: 17/294,392

(22) PCT Filed: Nov. 4, 2019

(86) PCT No.: PCT/CN2019/115366
§ 371 (c)(1),
(2) Date: May 15, 2021

(87) PCT Pub. No.: WO2020/098524
PCT Pub. Date: May 22, 2020

(65) Prior Publication Data
US 2022/0014230 A1 Jan. 13, 2022

(30) Foreign Application Priority Data
Nov. 16, 2018 (CN) .......................... 201811371889.9

(51) Int. Cl.
*H04B 1/7163* (2011.01)
*H04B 1/7176* (2011.01)
(52) U.S. Cl.
CPC ....... *H04B 1/71632* (2013.01); *H04B 1/7176* (2013.01)

(58) Field of Classification Search
CPC .............. H04B 1/71632; H04B 1/7176; H04B 1/71637; H04L 2027/0065; H04L 27/01; H04L 27/0014; H04L 5/0005
See application file for complete search history.

(56) References Cited

U.S. PATENT DOCUMENTS

2011/0249769 A1* 10/2011 Kang ................ H04L 25/03038
375/296
2012/0177084 A1 7/2012 Cupo
2018/0013604 A1 1/2018 Wenzel et al.

FOREIGN PATENT DOCUMENTS

CN  104065598 A  * 9/2014
JP  2006311056 A    11/2006

OTHER PUBLICATIONS

European Patent Office, EP19884525.7 Extended European Search Report dated Aug. 1, 2022.

(Continued)

*Primary Examiner* — Sam K Ahn
*Assistant Examiner* — Amneet Singh
(74) *Attorney, Agent, or Firm* — Li & Cai Intellectual Property (USA) Office (57) ABSTRACT

The present disclosure discloses a method and a device for extracting broadband error calibration parameters, and a computer-readable storage medium. The method includes: performing frequency band splitting on link broadband signals of an ultra-wide band system according to a received frequency band index table to generate sub-bands; extracting an amplitude error and a phase error of each sub-band; and iteratively weighting and accumulating, according to the frequency band index table and a preset broadband weight table, the amplitude error and the phase error of each sub-band one by one to an initial amplitude error compensation parameter and an initial phase error compensation parameter respectively, to synthesize and extract broadband (Continued)

error calibration parameters. The present disclosure can adaptively match a working bandwidth of the current ultra-wide band system, and perform iterative solution on error parameters of a working area in real time, thereby having the advantages of ultra-wide band, high performance, low power consumption and high flexibility.

16 Claims, 4 Drawing Sheets

(56) References Cited

OTHER PUBLICATIONS

Japan Patent Office, JP2021-526585 First Office Action dated Jun. 14, 2022.
Tobias Hidalgo Stitz, "Filter Bank Techniques for the Physical Layer in Wireless Commuications", Oct. 29, 2010, pp. 1-193.
Tobias Hidalgo Stitz, et al. "Filter-Bank-Based Narrowband Interference Detection and Suppression in Spread Spectrum Systmes", EURASIP Journal on Advances in Signal Processing, vol. 2004, No. 8, Jul. 8, 2004.

* cited by examiner

METHOD AND DEVICE FOR EXTRACTING BROADBAND ERROR CALIBRATION PARAMETERS AND COMPUTER-READABLE STORAGE MEDIUM

CROSS-REFERENCE TO RELATED APPLICATION

This is a National Phase Application filed under 35 U.S.C. 371 as a national stage of PCT/CN2019/115366 filed on Nov. 4, 2019, and an application claiming priority from Chinese patent application NO. 201811371889.9 entitled ""METHOD AND DEVICE FOR EXTRACTING BROADBAND ERROR CALIBRATION PARAMETERS AND COMPUTER-READABLE STORAGE MEDIUM",", filed on Nov. 16, 2018, the entire contents of each of which are incorporated herein by reference.

TECHNICAL FIELD

The present disclosure relates to the fields of digital signal processing and communication, and particularly relates to a method and a device for extracting broadband error calibration parameters, and a computer-readable storage medium.

BACKGROUND

Modern communication systems have increasingly high bandwidth requirements for radio frequency transceivers (e.g., 5G low frequency broadband zero intermediate frequency systems, 5G high frequency ultra-wide band systems). Conventional radio frequency analog devices are far insufficient to meet the specification requirements of the communication system. Digital-assisted analog calibration is a common optimization means, in which optimization to in-phase and quadrature (IQ) mismatch errors is performed in a quadrature modulation system so that stray leakage at a transmitting end is greatly suppressed, the receiving sensitivity at a receiving end is improved, and so on.

SUMMARY

The present disclosure provides a method for extracting broadband error calibration parameters, including: performing frequency band splitting on link broadband signals of an ultra-wide band system according to a received frequency band index table to generate sub-bands; extracting an amplitude error and a phase error of each sub-band; and iteratively weighting and accumulating, according to the frequency band index table and a preset broadband weight table, the amplitude error and the phase error of each sub-band one by one to an initial amplitude error compensation parameter and an initial phase error compensation parameter respectively, to synthesize and extract broadband error calibration parameters.

The present disclosure further provides a device for extracting broadband error calibration parameters, including a control module, a frequency band splitting module, a sub-band error extraction module and a broadband parameter synthesis module, the control module including a memory, a processor, and a computer program stored on the memory and executable on the processor, and when executed by the processor, the computer program causes the following steps to be implemented: controlling the frequency band splitting module to perform frequency band splitting on link broadband signals of an ultra-wide band system according to a received frequency band index table to generate sub-bands; controlling the sub-band error extraction module to extract an amplitude error and a phase error of each sub-band; and controlling the broadband parameter synthesis module to iteratively weight and accumulate, according to the frequency band index table and a preset broadband weight table, the amplitude error and the phase error of each sub-band one by one to an initial amplitude error compensation parameter and an initial phase error compensation parameter respectively, to synthesize broadband error calibration parameters.

The present disclosure further provides a computer readable storage medium having a computer program stored thereon which, when executed by a processor, causes steps of the method for extracting broadband error calibration parameters as described above to be implemented.

Implementations, functions, features and advantages of the present disclosure will be further explained below with reference to the embodiments and the accompanying drawings.

DETAILED DESCRIPTION

It will be appreciated that the specific embodiments described herein are merely for illustration of the disclosure and are not intended to limit the disclosure.

There are many digital-assisted methods for IQ mismatch error calibration, for example:

1) subjecting signals to Fast Fourier Transformation (FFT), detecting in the frequency domain to acquire errors at each frequency point, and processing by least mean square (LMS) iteration using the errors, before finally compensating the parameter;

2) using offline parameters for calculation and adjustment, performing offline tests using a signal source, a frequency spectrograph and a computer, and measuring a specific module in detail to finally obtain a set of fixed compensation parameters;

3) extracting parameters at multiple frequency points in a single-tone sweep method, carrying out system error calibration after error parameters of the frequency points are fitted, and extracting error information of each frequency point to achieve the effect of broadband calibration;

4) directly using reference signals to carry out related operations and extract parameters, and extracting error parameters for compensation;

5) performing parameter extraction and compensation in an adaptive filter blind iteration method using broadband signal characteristics, and optimizing to obtain the final parameters; and 6) decomposing broadband signals by a bank of bandpass filters in the digital domain, directly acquiring errors of a broadband system through complex operations, and finally obtaining the broadband compensation parameters through inverse solution.

The above methods are all applied in current products in the industry to some extent, but each has its drawbacks. For example, the method 1) requires conversions between the time domain and the frequency domain, which is very effective in baseband processing, but leads to huge source consumption in the medium radio frequency, and sharp rise of the implementation complexity in a later ultra-wide band system. The methods 2) and 3) are suitable for scenarios with a stable environment, but cannot adapt to error changes caused by changes in the external environment. Parameters of the method 2 cannot be corrected along with the environment, while the sweep processing in the method 3) cannot be realized in the working stage of the system, and thus real-time processing of the broadband cannot be achieved. The method 4) realizes real-time tracking, but has limited adaptability to bandwidth. Generally, it is difficult to adapt to a signal bandwidth exceeding 30 M, and thus is impossible to calibrate broadband signals. The methods 5) and 6) are two practical broadband calibration methods at present. However, the method 5) adopts blind iteration, which involves unstable iteration parameters under the condition of signal mutation, resulting in performance deterioration of some frequency points and the system. The method 6) has the defects that as the demands on the bandwidth and the precision increase, the required resources will sharply rise, and the flexibility thereof is poor in terms that once the system is set, the solution precision and the adaptive bandwidth thereof are fixed and unchangeable.

In summary, current IQ mismatch error calibration methods all have the technical problems of complex processing and poor flexibility.

The above is only for the aid of understanding the present disclosure, and does not represent an admission that the above is prior art.

A method provided in the present disclosure includes: performing frequency band splitting on link broadband signals of an ultra-wide band system according to a received frequency band index table to generate sub-bands; extracting an amplitude error and a phase error of each sub-band; and iteratively weighting and accumulating, according to the frequency band index table and a preset broadband weight table, the amplitude error and the phase error of each sub-band one by one to an initial amplitude error compensation parameter and an initial phase error compensation parameter respectively, to synthesize and extract broadband error calibration parameters.

The method and the device for extracting broadband error calibration parameters, and the computer-readable storage medium provided herein relate to the fields of digital signal processing and communication and are particularly suitable for processing IQ image errors in broadband signals caused by link characteristics, and for calibration of an ultra-wide band radio frequency system in a wireless communication system, such as analog IQ error calibration of a 5G low frequency broadband zero intermediate frequency system and IQ equalization of a 5G high frequency ultra-wide band system.

Due to the technical problems of complex processing and poor flexibility of the IQ mismatch error calibration methods in some cases, the present disclosure adopts an iterative method for frequency band splitting, in which sub-band splitting is performed on an ultra-wide band system so that IQ mismatch errors of each sub-band are adaptively processed to obtain error time-varying characteristics (i.e., amplitude errors and phase errors) of each sub-band, and broadband error calibration parameters of the whole ultra-wide band system are obtained through real-time iterative solution, thereby the IQ image problem of the ultra-wide band system is solved.

Figure 1:
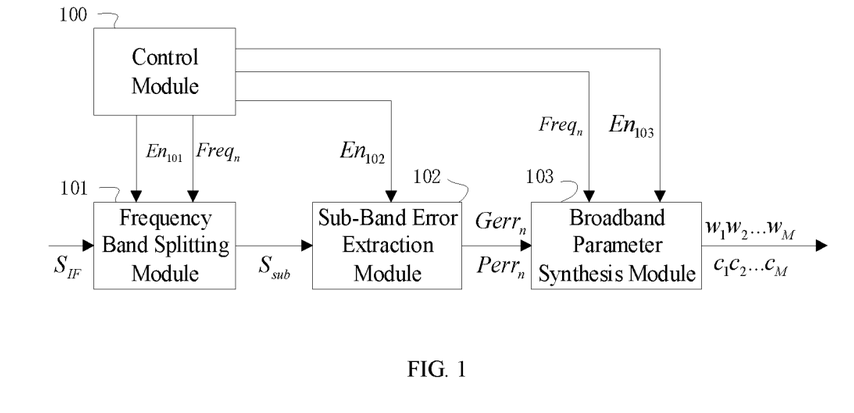
FIG. 1 is a diagram showing basic architecture of a device for extracting broadband error calibration parameters according to the present disclosure.

As shown in FIG. 1, FIG. 1 is a diagram showing basic architecture of a device for extracting broadband error calibration parameters according to the present disclosure.

The device for extracting broadband error calibration parameters includes a control module 100, a frequency band splitting module 101, a sub-band error extraction module 102 and a broadband parameter synthesis module 103. The control module 100 is in communication with the frequency band splitting module 101, the sub-band error extraction module 102 and the broadband parameter synthesis module 103, respectively.

The control module 100 is configured to control operation steps of an entire ultra-wide band system, and to control input parameters of each module, including a splitting range, a splitting step, a splitting frequency point control word of the frequency band splitting module 101, and a synthesis frequency index of the broadband parameter synthesis module 103.

In an implementation, the control module 100 may control an operation sequence of the frequency band splitting module 101, the sub-band error extraction module 102, and the broadband parameter synthesis module 103 via three enable signals $En_{101}$, $En_{102}$ and $En_{103}$, while controlling information relating a sub-band frequency point $Freq_n$ for broadband splitting and broadband synthesis according to user's configuration.

The frequency band splitting module 101 is configured to perform frequency band splitting on an ultra-wide band received signal, and extract signals and image information of the sub-band to ensure integrity of the sub-band error information.

In an implementation, the frequency band splitting module determines information relating the frequency points of the sub-band to be split according to information relating the sub-band frequency point $Freq_n$, performs sub-band splitting on an input broadband signal SW, and transmits the split signal $S_{sub}$ to the module 102 in real time.

The sub-band error extraction module 102 is configured to filter signals of the sub-bands, calculate IQ amplitude-phase errors of the sub-band system, and extract error parameters (i.e., an amplitude error and a phase error) of the current sub-band.

In an implementation, the sub-band error extraction module 102 is controlled by $En_{102}$ output from the control module 100 to extract power information, phase information and IQ-related information of the sub-band signal $S_{sub}$ output in real time from the frequency band splitting module 101, and to output error parameters $Gerr_n$ and $Perr_n$ of the current sub-band (the band of $Freq_n$) after extraction, where $Gerr_n$ is the amplitude error, and $Perr_n$ is the phase error.

The broadband parameter synthesis module 103 includes a broadband weight table LUT generated offline, which is a one-dimensional index table in which index parameters are normalized frequencies, and the output is an index frequency point weight vector, a sub-band error is weighted according to the amplitude error and the phase error thereof, and accumulated in an initial broadband error parameter to obtain an updated broadband error calibration parameter.

The broadband parameter synthesis module 103 processes the current sub-band error parameters $Gerr_n$ and $Perr_n$ according to the enable signal $En_{102}$ and relevant information of the sub-band frequency point $Freq_n$, performs weighting update of the broadband error parameter with simplified LS (least square), before finally outputting the broadband error calibration parameter.

Figure 2:
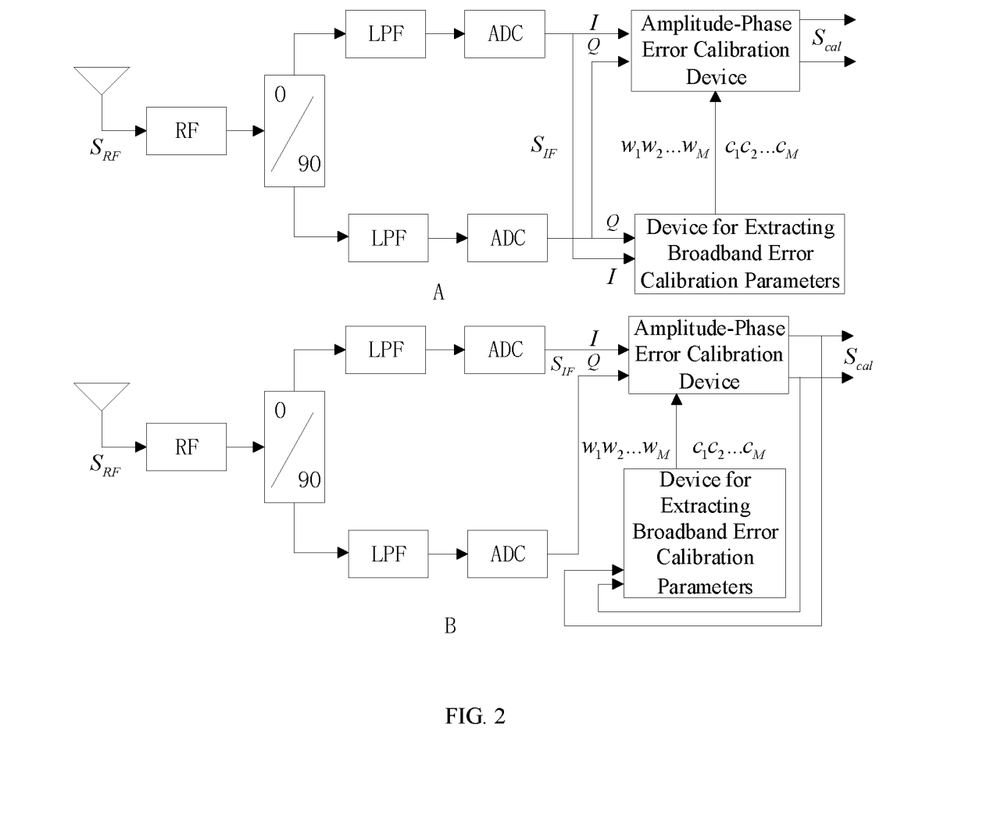
FIG. 2 shows two processing positions of the device for extracting broadband error calibration parameters according to the present disclosure applied in an ultra-wide band system.

Referring to FIG. 2, FIG. 2 shows two processing positions of the device for extracting broadband error calibration parameters according to the present disclosure implemented in an ultra-wide band system. For a receiving system, a signal $S_{RF}$ received by an antenna is subjected to mixing of Radio Frequency (RF) and filtering of intermediate frequency (Low Pass Filter, LPF) so that an intermediate frequency broadband signal is obtained, and a high-speed Analog-to-Digital Converter (ADC) converts an analog broadband signal to output a broadband digital signal $S_{IF}$, where the signal includes a desired signal and an interference signal, such as an image signal, generated by a system error. The broadband digital signal then passes through the device for extracting broadband error calibration parameters so that a desired signal $S_{cal}$ is output.

For the first solution, as shown in part A of FIG. 2, the broadband signal $S_{IF}$ is also captured by the broadband error calibration parameter iterator in the device for extracting broadband error calibration parameters herein, so that the broadband error calibration parameters are extracted, and amplitude calibration parameters $w_1, w_2, \ldots, w_M$ and phase calibration parameters $c_1, c_2, \ldots, c_M$ are output to the amplitude-phase error calibration device, thereby completing closed-loop calibration of the errors on the whole link.

For the second solution, as shown in part B of FIG. 2, the desired signal $S_{cal}$ is captured by the broadband error calibration parameter iterator in the device for extracting broadband error calibration parameters herein, so that a residual error in the desired signal $S_{cal}$ is obtained and used for extracting the broadband error calibration parameters, and amplitude calibration parameters $w_1, w_2, \ldots, w_M$, and phase calibration parameters $c_1, c_2, \ldots, c_M$ are output to the amplitude-phase error calibration device, thereby completing closed-loop calibration of the errors on the whole link.

Figure 3:
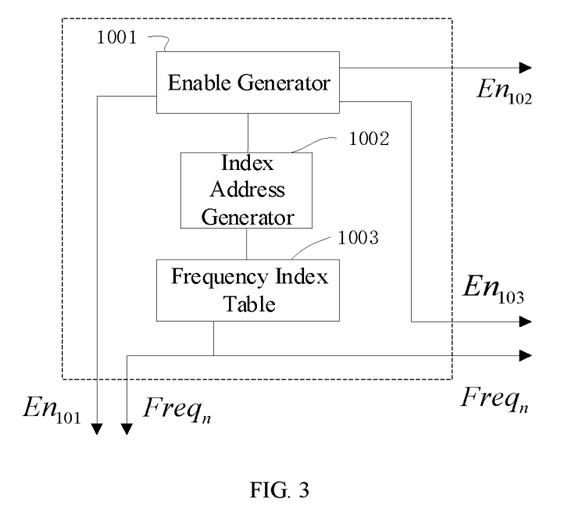
FIG. 3 is a structural diagram of a control module according to the present disclosure.

Referring to FIG. 3, FIG. 3 shows a structural diagram of a control module according to the present disclosure. Inside the control module, there are three sub-structures, i.e., an enable generator 1001, an index address generator 1002, and a frequency index table 1003.

The enable generator 1001 is a simple self-increment structure that can generate, at four fixed value points, one internal enable signal for the address module 1002, and three external enable signals $En_{101}, En_{102}, En_{103}$ for the frequency band splitting module 101, the sub-band error extraction module 102 and the broadband parameter synthesis module 103, respectively, so as to control a starting sequence of the frequency band splitting module 101, the sub-band error extraction module 102 and the broadband parameter synthesis module 103. An iteration speed of the system may be controlled by controlling a length of the self-increment number, and a delay in the operation time of the frequency band splitting module 101, the sub-band error extraction module 102 and the broadband parameter synthesis module 103 may be controlled by adjusting the four fixed value points.

When the enable generator 1001 generates enable, the index address generator 1002 performs address self-increment once and outputs the address subjected to the self-increment to the frequency index table 1003, thereby forming loop processing of the sub-bands in the whole frequency band.

The frequency index table 1003 is a configurable RAM with internal values configurable by a user, which performs table lookup according to the address output from the index address generator 1002, and outputs the same frequency control word $Freq_n$ (related information of the sub-band frequency point $Freq_n$) to the frequency band splitting module 101 and the broadband parameter synthesis module 103.

Figure 4:
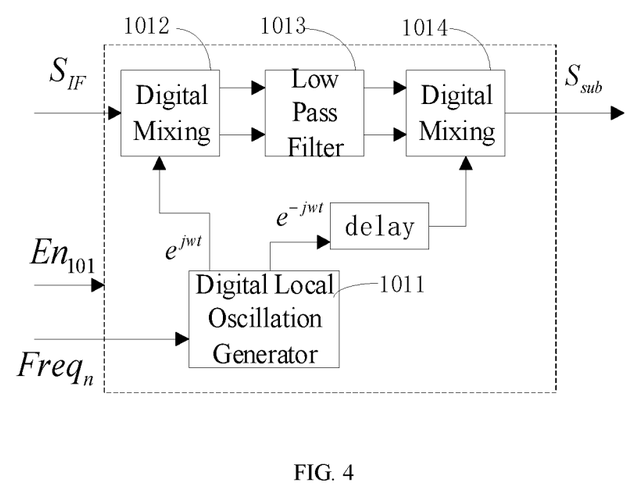
FIG. 4 is a structural diagram of a frequency band splitting module according to the present disclosure.

Referring to FIG. 4, FIG. 4 shows a structural diagram of a frequency band splitting module 101 according to the present disclosure. Inside the frequency band splitting module 101, there are four sub-structures, i.e., a digital local oscillation generator 1011, a first digital mixing module (i.e., a frequency shift module) 1012, a low pass filter module 1013 and a second digital mixing module (i.e., a reverse frequency shift module) 1014.

The digital local oscillation generator 1011 implements generation of digital local oscillation signals by using a table lookup method or Coordinate Rotation Digital Computer (CORDIC) algorithm according to the frequency control word $Freq_n$ generated by the control module 100. One set of signals are directly sent to the frequency shift module 1012, while the other set is sent to the reverse frequency shift module 1014 after being delayed with a delay amount equal to a low pass filtering processing delay of the low pass filter module 1013. Thus, it is ensured that a frequency shift phase difference between the frequency shift module 1012 and the reverse frequency shift module 1014 is controllable.

The first digital mixing module 1012 is a general signal frequency shift module, which shifts the input broadband signals by shifting the sub-bands and image bands thereof to zero frequency, and outputs them to the filter in the low pass filter module 1013 for filtering, thereby realizing splitting of a broad frequency band and sub-band signal extraction.

The second digital mixing module 1014 is a reverse frequency shift module, which shifts the sub-band signals filtered by the low pass filter module 1013 and synthesize the sub-band signals after the frequency band splitting, thereby completing frequency band splitting of the entire broadband signal, ensuring integrity of the sub-band IQ error, and finally outputting the sub-band signal $S_{sub}$.

Figure 5:
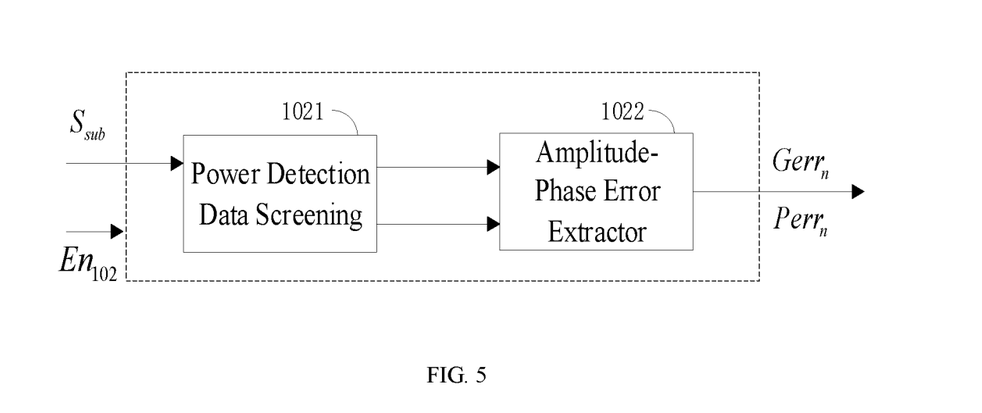
FIG. 5 is a structural diagram of a sub-band error extraction module according to the present disclosure.

Referring to FIG. 5, FIG. 5 shows a structural diagram of a sub-band error extraction module 102 according to the present disclosure. The sub-band error extraction module 102 includes a power detection data screening module 1021 and an amplitude-phase error extractor 1022. The power detection data screening module 1021 is configured to monitor characteristics of the current sub-band signal $S_{sub}$ to screen out sub-band signals suitable for parameter extraction, while removing abnormal signals (a sub-band signal having a sub-band signal power greater than a first threshold and a sub-band image power less than a second threshold is a valid signal; otherwise, it is an abnormal signal), so as to ensure robustness of the amplitude-phase error extractor 1022 in later parameter extraction. The amplitude-phase error extractor 1022 may calculate an amplitude-phase error of the sub-band through a method such as first-order and second-order statistics or polynomial fitting, and compare the amplitude-phase error with the last iteration error to output an amplitude error $Gerr_n$ and a phase error $Perr_n$ of the current sub-band in the current iteration, where $Gerr_n$ is the amplitude error, and $Perr_n$ is the phase error.

Figure 6:
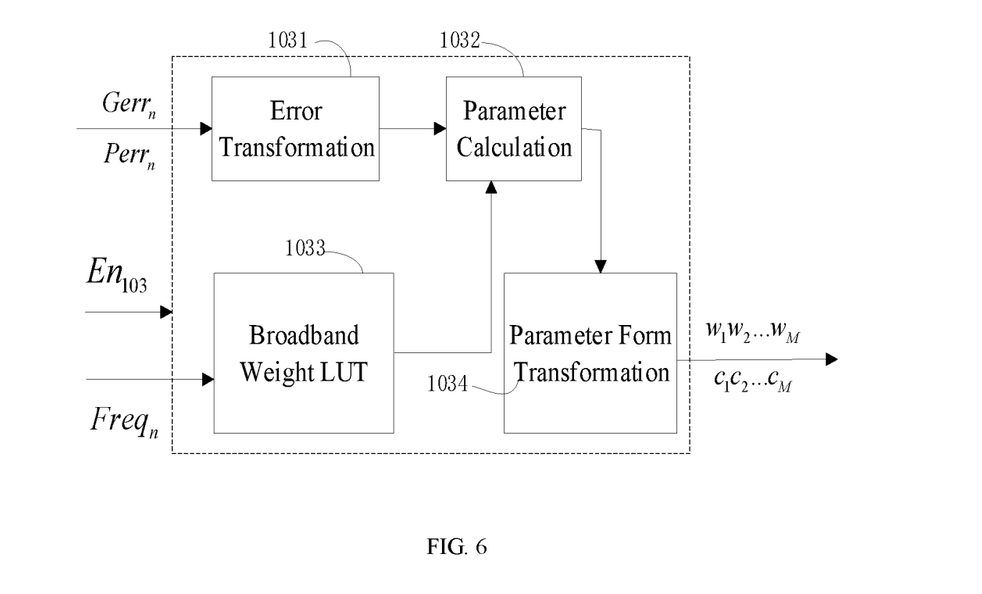
FIG. 6 is a structural diagram of a broadband parameter synthesis module according to the present disclosure.

Referring to FIG. 6, FIG. 6 shows a structural diagram of a broadband parameter synthesis module 103 according to the present disclosure. The broadband parameter synthesis module 103 includes an error parameter transformation module 1031, a parameter calculation module 1032, a broadband weight LUT (i.e. a preset bandwidth weight table) 1033 and a parameter form transformation module 1034.

The error parameter transformation module 1031 transforms the actual amplitude and phase errors of a sub-band into error compensation parameters for the sub-band. For an amplitude error Gen, and a phase error Pen, output by the sub-band error extraction module 102, the specific transformation formula is:

$$CoefI_n = \tan(Perr_n)$$
$$CoefQ_n = \frac{Gerr_n}{\cos(Perr_n)}.$$

A sub-band error parameter compensation value is obtained after the transformation.

The parameter calculation module 1032 is a vector weighting multiplier and adder that weights and accumulates the new amplitude error compensation parameter $CoefI_n$ and the weight vector $LUT_{Freqn}$ output by the broadband weight LUT 1033 to the original parameter $CI_{n-1}$ to obtain a new error compensation parameter $CI_n$; weights and accumulates the new phase error compensation parameter $CoefQ_n$ and the weight vector $LUT_{Freqn}$ to the original parameter $CQ_{n-1}$ to obtain a new phase error compensation parameter $CQ_n$; and finally generates new broadband calibration parameters $CI_n$ and $CQ_n$.

$$CI_n = CoefI_n * LUT_{Freqn} + CI_{n-1}$$

$$CQ_n = CoefQ_n * LUT_{Freqn} + CQ_{n-1}.$$

The broadband weight LUT 1033 uses the frequency $Freq_n$ of the control module 100 as an input parameter, and table contents of the broadband weight LUT 1033 are generated off-line by a user, or generated and stored according to a user-configured frequency word in the initial stage of the system. The broadband weight LUT 1033 is a one-dimensional index table, in which the input index variable is a frequency control word $Freq_n$, and the output is a column of weight vectors. The broadband weight LUT 1033 is generated based on the following principle:

Suppose that a user sets up a system working band as [−BW/(2*Fs), BW/(2*Fs)], the sub-band frequency points are Freq1, Freq2, . . . , FreqN ∈[−BW/(2*Fs), BW/(2*Fs)], the corresponding angular frequencies are ω1, ω2, . . . , ωN, BW is the user-demanded bandwidth, and Fs is the application data rate, M is an order of a compensation parameter set by the user, the angular frequency is 2π/Fs, and j is an imaginary number.

Then the frequency sampling matrix F generated from the frequency control word is:

$$F = \begin{bmatrix} e^{-jw1\frac{M-1}{2}} & e^{-jw1\frac{M-3}{2}} & \cdots & e^{jw1\frac{M-1}{2}} \\ e^{-jw2\frac{M-1}{2}} & e^{-jw2\frac{M-3}{2}} & \cdots & e^{jw2\frac{M-1}{2}} \\ \vdots & \vdots & \ddots & \vdots \\ e^{-jwN\frac{M-1}{2}} & e^{-jwN\frac{M-3}{2}} & \cdots & e^{jwN\frac{M-1}{2}} \end{bmatrix}.$$

The table matrix of the broadband weight LUT that is ultimately generated is:

$$LUT = (F^H F)^{-1} F^H,$$

which is an M×N matrix, in which each frequency index word corresponds to a column of vectors, and each time the frequency index outputs a column of weighted vectors for error weighting performed by the parameter calculation module 1032.

The parameter form transformation module 1034 may, according to an actual calibration implementation structure in the ultra-wide band system, transform the generated broadband error calibration parameter into a form corresponding to the calibration implementation structure, and then output the same to the link for compensation.

The weighted output of the parameter form transformation module 1034 may be in the form of two sets of complex symmetric filters, which can be transformed into various output forms according to the link design:

1. in response to that the link calibration is a complex filter structure, directly outputting $[w_1, w_2 \ldots w_M]_n$ and $[c_1, c_2 \ldots c_M]_n$ to the link for calibration;

2. in response to that the link calibration is a real filter bank structure, transforming into f0=real $([w_1, w_2 \ldots w_M]_n)$, f1=imag$([w_1, w_2 \ldots w_M]_n)$, f2=real $([c_1, c_2 \ldots c_M]_n)$, and f3=imag$([c_1, c_2 \ldots c_M]_n)$ to be output to the link for calibration;

3. in response to that the link calibration is a symmetrical complex filter, outputting $[w_1, w_2 \ldots w_{(M+1)/2}]_n$, $[c_1, c_2 \ldots c_{(M+1)/2}]_n$ for use by the link; and 4. transformations of other arbitrary filter implementation structures, etc.

Figure 7:
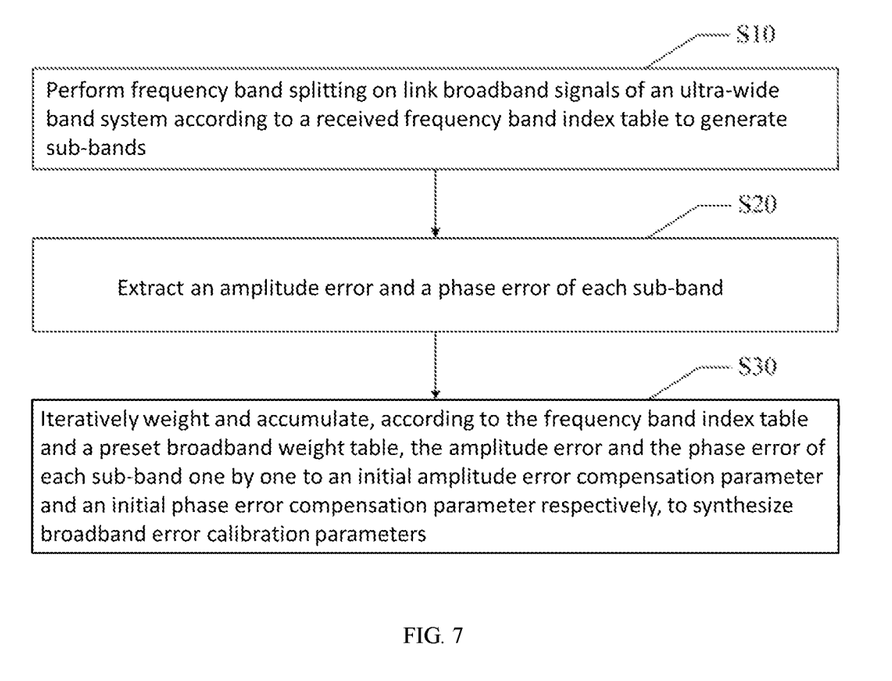
FIG. 7 is a schematic flowchart of an implementation of a method for extracting broadband error calibration parameters according to the present disclosure.

Based on the above device for extracting broadband error calibration parameters, there is provided a method for extracting broadband error calibration parameters which, referring to FIG. 7, includes the following steps S10 to S30.

At step S10, frequency band splitting is performed on link broadband signals of an ultra-wide band system according to a received frequency band index table to generate sub-bands.

A user may input parameters and generate a frequency band index table according to the actual condition of the current ultra-wide band system to be calibrated and the actual requirement, so that the control module receives the frequency band index table input by the user, and controls the frequency band splitting module to perform frequency band splitting on the link broadband signals of the ultra-wide band system according to the frequency band index table to generate the sub-bands.

In an implementation, step S10 includes the following steps S11 to S12.

At step S11, the received frequency band index table is parsed to obtain splitting parameters including a splitting range, a splitting step and sub-band frequency points for splitting positioning.

The frequency band index table includes sub-band frequency points Freq1, Freq2, . . . , Freqn, and Freq1, Freq2, . . . , Freqn ∈[−BW/(2*Fs), BW/(2*Fs)], the sub-band frequency points may be used for locating splitting positions. The frequency band index table further includes splitting parameters for guiding the frequency band splitting module to split the link broadband signal of the ultra-wide band system. The splitting parameters include a splitting range being the sub-band range, i.e., [−BW/(2*Fs), BW/(2*Fs)], where BW is the user-demanded bandwidth, and Fs is the application data rate. In an implementation, the splitting parameters include a splitting step, i.e., a band gap between two splitting points, or a band gap between two sub-band frequency points. The control module parses the received frequency band index table to obtain splitting parameters, including a splitting range, a splitting step and sub-band frequency points for splitting positioning.

At step S12, a splitting position is determined in the splitting range according to the splitting step and the sub-band frequency points, and frequency band splitting is performed on each link broadband signal of the ultra-wide band system one by one according to the splitting position to generate the sub-bands.

When the splitting position exceeds the splitting range, the control module gives up determination of the splitting position at this time; and when the splitting position is within the splitting range, the control module determines that the splitting position is valid. Therefore, the control module determines the splitting positions (which may correspond to positions of the sub-band frequency points one by one) in the splitting range based on a boundary position of the splitting range and the splitting step, and then performs frequency band splitting on each link broadband signal of the ultra-wide band system one by one according to the splitting position to generate the sub-bands.

At step S20, an amplitude error and a phase error of each sub-band are extracted.

In an implementation, the sub-band error extraction module detects a signal power and an image power of each sub-band one by one to remove abnormal sub-bands from the sub-bands, so as to obtain valid sub-bands having a signal power greater than a first threshold and an image power less than a second threshold; and the sub-band error extraction module calculates the amplitude error and the phase error of each valid sub-band based on a preset algorithm.

A power detection data screening module of the sub-band error extraction module detects the signal power and the image power of each sub-band one by one. Then, the power detection data screening module compares the signal power of each sub-band with a preset first threshold, and compares the image power of each sub-band with a preset second threshold one by one, and removes abnormal sub-bands from the sub-bands, so as to obtain valid sub-bands having a signal power greater than the first threshold and an image power less than the second threshold and ensure robustness of the amplitude-phase error extractor of the sub-band error extraction module during the subsequent parameter extraction.

Further, the amplitude-phase error extractor calculates the amplitude error and the phase error of each valid sub-band through a preset algorithm such as first-order and second-order statistics or polynomial fitting, the valid sub-band under calculation each time is the current sub-band, and the amplitude error and the phase error of the current sub-band are respectively compared with the last iteration errors (which are the initial amplitude error and the initial phase error in the case of a first iteration; and otherwise, are previous amplitude and phase errors of the sub-band before the current sub-band) to output the amplitude error Gem, and the phase error Pen, of the current sub-band in this iteration.

In an implementation, screening of the proper sub-band signal may be performed by using a sub-band signal power value (i.e., signal power) and an image power value (i.e., image power). When the signal power value is greater than a threshold (i.e., the first threshold) and the image power value is lower than a threshold (i.e., the second threshold), the sub-band is considered as a valid sub-band for error data (i.e., amplitude error and phase error) extraction; otherwise, move to the next sub-band.

The calculated amplitude error $Gerr_n$ and phase error $Perr_n$ are checked and compared with the amplitude error $Gerr_{n-1}$ and the phase error $Perr_{n-1}$ calculated in a previous time. If the current errors are smaller than the previous ones, it is considered that the error is converged, and the amplitude error $Gerr_n$ and the phase error $Perr_n$ are directly output; otherwise, multiple strategies may be adopted for processing, including: a. directly switching to a next sub-band since the current sub-band is considered as abnormal; and b. outputting $m*Gerr_n+n*Gerr_{n-1}$ and $m*Perr_n+n*Perr_{n-1}$ as new error parameters after weighting processing, where m and n are weighting parameters and may be configured by a user.

At step S30, according to the frequency band index table and a preset broadband weight table, the amplitude error and the phase error of each sub-band are iteratively weighted and accumulated one by one to an initial amplitude error compensation parameter and an initial phase error compensation parameter respectively, to synthesize broadband error calibration parameters.

In an implementation, the frequency band index table includes sub-band frequency points $Freq1, Freq2, \ldots, Freqn$, and $Freq1, Freq2, \ldots, Freqn \in [-BW/(2*Fs), BW/(2*Fs)]$; where the sub-band range is $[-BW/(2*Fs), BW/(2*Fs)]$, BW is the user-demanded bandwidth, and Fs is the application data rate; and Step S30 includes the following steps S31 to S34.

At step S31, an amplitude error compensation parameter and a phase error compensation parameter are obtained for each sub-band based on the following Equation 2:

$$is: \begin{array}{l} CoefI_n = \tan(Perr_n) \\ CoefQ_n = \dfrac{Gerr_n}{\cos(Perr_n)} \end{array}, \qquad \text{Equation 2}$$

where $Gerr_n$ is the amplitude error, $Perr_n$ is the phase error, $CoefI_n$ is the new amplitude error compensation parameter, and $CoefQ_n$ is the new phase error compensation parameter.

At step S32, the new amplitude error compensation parameter $CoefI_n$ is weighted by a weight vector $LUT_{Freqn}$ corresponding to $Freq_n$ in the preset broadband weight table, and accumulated to an original amplitude compensation parameter $CI_{n-1}$, where $CI_0$ is the initial amplitude error compensation parameter.

At step S33, the new phase error compensation parameter $CoefQ_n$ is weighted by a weight vector $LUT_{Freqn}$ corresponding to $Freq_n$ in the preset broadband weight table, and accumulated to an original phase compensation parameter $CQ_{n-1}$, where $CQ_0$ is the initial phase error compensation parameter.

At step S34, the latest broadband error calibration parameters $CI_n$ and $CQ_n$ are generated based on the following Equation 3, $$CI_n = CoefI_n * LUT_{Freqn} + CI_{n-1}$$

$$CQ_n = CoefQ_n * LUT_{Freqn} + CQ_{n-1}. \qquad \text{Equation 3:}$$

By performing sub-band splitting and division through time division in the time domain, the present disclosure can achieve the purpose of extracting the ultra-wide band error calibration parameters by multiple times of time domain division, and can be applicable to an ultra-wide band system, namely, having the advantage of ultra-wide band. In addition, by processing in a time division multiplexing method, the present disclosure reduces the resource overhead of hardware and the power consumption of the ultra-wide band system, namely, has the advantage of low power consumption.

Moreover, by increasing the number of sub-band frequency points, reducing sub-band bandwidth, and improving a fitting accuracy of the sub-band errors, a user can notably improve performance of each sub-band error parameter, and thus improve the error calibration performance over the whole bandwidth, namely, the present disclosure has the advantage of high performance. Further, with given hardware, a user can configure the sub-band range and the sub-band bandwidth to adapt to different system bandwidths and different performance requirements without changing the hardware structure, namely, the present disclosure has the advantage of high flexibility.

In an implementation of the method for extracting broadband error calibration parameters of the present disclosure, before step S10, the method further includes the following steps S41 to S44.

At step S41, a sub-band range is determined in an initialization stage of the ultra-wide band system according to the received user-demanded bandwidth and application data rate of the ultra-wide band system.

In an implementation, the sub-band range is determined based on the following: the sub-band range is [−BW/(2*Fs), BW/(2*Fs)], where BW is the user-demanded bandwidth, and Fs is the application data rate. Assuming that the sub-band range is FR, then FR is: [−BW/(2*Fs), BW/(2*Fs)].

At step S42, sub-band frequency points are determined in the sub-band range according to a splitting step length and a splitting range from an external input, to form the frequency band index table.

The frequency band index table includes sub-band frequency points Freq1, Freq2, . . . , Freqn, and Freq1, Freq2, . . . , Freqn ∈[−BW/(2*Fs), BW/(2*Fs)], where the sub-band frequency points may be used for locating splitting positions. The frequency band index table further includes splitting parameters for guiding the frequency band splitting module to split the link broadband signal of the ultra-wide band system. The splitting parameters include a splitting range being the sub-band range, i.e., [−BW/(2*Fs), BW/(2*Fs)], where BW is the user-demanded bandwidth, and Fs is the application data rate. In an implementation, the splitting parameters include a splitting step, i.e., a band gap between two splitting points, or a band gap between two sub-band frequency points. The control module parses the received frequency band index table to obtain splitting parameters, including a splitting range, a splitting step and sub-band frequency points for splitting positioning.

At step S43, an angular frequency of each sub-band frequency point is determined according to the application data rate.

In an implementation, the angular frequency of each sub-band frequency point is $2\pi/Fs$, where Fs is the application data rate.

At step S44, a frequency sampling matrix is generated according to each angular frequency and a compensation parameter order from the external input, and a preset broadband weight table is generated based on the frequency sampling matrix.

In an implementation, the step of generating the frequency sampling matrix according to each angular frequency and the compensation parameter order from the external input in step S44 includes:

determining the frequency sampling matrix F according to the following Equation 1:

$$F = \begin{bmatrix} e^{-jw1\frac{M-1}{2}} & e^{-jw1\frac{M-3}{2}} & \cdots & e^{jw1\frac{M-1}{2}} \\ e^{-jw2\frac{M-1}{2}} & e^{-jw2\frac{M-3}{2}} & \cdots & e^{jw2\frac{M-1}{2}} \\ \vdots & \vdots & \ddots & \vdots \\ e^{-jwN\frac{M-1}{2}} & e^{-jwN\frac{M-3}{2}} & \cdots & e^{jwN\frac{M-1}{2}} \end{bmatrix},$$ Equation 1 where M is the compensation parameter order from the external input, w is the angular frequency of each sub-band frequency point, and j is an imaginary number.

The step of generating a preset broadband weight table based on the frequency sampling matrix in step S44 includes:

generating based on $LUT=(F^H F)^{-1} F^H$, where LUT is the preset broadband weight table, and F is the frequency sampling matrix.

In the present disclosure, new device and method for extracting broadband error parameters are proposed, which device and method do not need any external reference auxiliary module, but directly use system service signals for processing, perform frequency band splitting on an ultra-wide band system in an iterative manner to divide the ultra-wide band system into sub-bands, and then extract sub-band errors, and perform synthesis processing on error parameters of different sub-bands, so as to adaptively match a working bandwidth of the current system, and perform iterative solution on error parameters of a working area in real time, thereby having the advantages of ultra-wide band, high performance, low power consumption and high flexibility.

The present disclosure further provides a device for extracting broadband error calibration parameters, including a control module, a frequency band splitting module, a sub-band error extraction module and a broadband parameter synthesis module. The control module includes a memory, a processor, and a computer program stored on the memory and executable on the processor. The computer program, when executed by the processor, causes the following steps to be implemented: controlling the frequency band splitting module to perform frequency band splitting on link broadband signals of an ultra-wide band system according to a received frequency band index table to generate sub-bands; controlling the sub-band error extraction module to extract an amplitude error and a phase error of each sub-band; and controlling the broadband parameter synthesis module to iteratively weight and accumulate, according to the frequency band index table and a preset broadband weight table, the amplitude error and the phase error of each sub-band one by one to an initial amplitude error compensation parameter and an initial phase error compensation parameter respectively, to synthesize broadband error calibration parameters.

In an implementation, the computer program, when executed by the processor, causes the following steps to be implemented: controlling the control module to determine a sub-band range in an initialization stage of the ultra-wide band system according to the received user-demanded bandwidth and application data rate of the ultra-wide band system; controlling the control module to determine sub-band frequency points in the sub-band range according to a splitting step length and a splitting range from an external input, to form the frequency band index table; controlling the control module to determine an angular frequency of each sub-band frequency point according to the application data rate; and controlling the control module to generate a frequency sampling matrix according to each angular frequency and a compensation parameter order from the external input, and generate a preset broadband weight table based on the frequency sampling matrix.

In an implementation, in the initialization stage of the ultra-wide band system, the control module determines the sub-band range according to the received user-demanded bandwidth and application data rate of the ultra-wide band system.

In an implementation, the frequency band index table includes sub-band frequency points Freq1, Freq2, . . . , Freqn, and Freq1, Freq2, . . . , Freqn $\in$[−BW/(2*Fs), BW/(2*Fs)].

The control module takes 2π/Fs as the angular frequency of each sub-band frequency point, and Fs is the application data rate.

In an implementation, the control module determines the frequency sampling matrix F according to the following Equation 1:

$$F = \begin{bmatrix} e^{-jw1\frac{M-1}{2}} & e^{-jw1\frac{M-3}{2}} & \cdots & e^{jw1\frac{M-1}{2}} \\ e^{-jw2\frac{M-1}{2}} & e^{-jw2\frac{M-3}{2}} & \cdots & e^{jw2\frac{M-1}{2}} \\ \vdots & \vdots & \ddots & \vdots \\ e^{-jwN\frac{M-1}{2}} & e^{-jwN\frac{M-3}{2}} & \cdots & e^{jwN\frac{M-1}{2}} \end{bmatrix}, \quad \text{Equation 1}$$

where M is the compensation parameter order from the external input, w is the angular frequency of each sub-band frequency point, and j is an imaginary number.

The step of generating the preset broadband weight table based on the frequency sampling matrix includes: generating based on LUT=$(F^H F)^{-1} F^H$, where LUT is the preset broadband weight table, and F is the frequency sampling matrix.

In an implementation, the computer program, when executed by the processor, causes the following steps to be implemented: controlling the frequency band splitting module to parse the received frequency band index table to obtain splitting parameters including a splitting range, a splitting step and sub-band frequency points for splitting positioning; and controlling the frequency band splitting module to determine a splitting position in the splitting range according to the splitting step and the sub-band frequency points, and perform frequency band splitting on each link broadband signal of the ultra-wide band system one by one according to the splitting position to generate the sub-bands.

In an implementation, the computer program, when executed by the processor, causes the following steps to be implemented: controlling the sub-band error extraction module to detect a signal power and an image power of each sub-band one by one, and remove abnormal sub-bands from the sub-bands, so as to obtain valid sub-bands having a signal power greater than a first threshold and an image power less than a second threshold; and controlling the sub-band error extraction module to calculate an amplitude error and a phase error of each valid sub-band based on a preset algorithm.

In an implementation, the frequency band index table includes sub-band frequency points of Freq1, Freq2, . . . , Freq$_n$, and Freq1, Freq2, . . . , Freq$_n$ $\in$[−BW/(2*Fs), BW/(2*Fs)]; where the sub-band range is [−BW/(2*Fs), BW/(2*Fs)], BW is the user-demanded bandwidth, and Fs is the application data rate.

The computer program, when executed by the processor, causes the following steps to be implemented:

controlling the broadband parameter synthesis module to obtain an amplitude error compensation parameter and a phase error compensation parameter for each sub-band based on the following Equation 2:

$$\text{is}: \begin{array}{l} CoefI_n = \tan(Perr_n) \\ CoefQ_n = \dfrac{Gerr_n}{\cos(Perr_n)} \end{array}, \quad \text{Equation 2}$$

where $Gerr_n$ is the amplitude error, $Perr_n$ is the phase error, $CoefI_n$ is the new amplitude error compensation parameter, and $CoefQ_n$ is the new phase error compensation parameter;

controlling the broadband parameter synthesis module to weight the new amplitude error compensation parameter $CoefI_n$ by a weight vector $LUT_{Freqn}$ corresponding to $Freq_n$ in the preset broadband weight table, and accumulate the same to an original amplitude compensation parameter $CI_{n-1}$, where $CI_0$ is the initial amplitude error compensation parameter;

controlling the broadband parameter synthesis module to weight the new phase error compensation parameter $CoefQ_n$ by a weight vector $LUT_{Freqn}$ corresponding to $Freq_n$ in the preset broadband weight table, and accumulate the same to an original phase compensation parameter $CQ_{n-1}$, where $CQ_0$ is the initial phase error compensation parameter; and controlling the broadband parameter synthesis module to generate the latest broadband error calibration parameters $CI_n$ and $CQ_n$ based on the following Equation 3, $$CI_n = CoefI_n * LUT_{Freqn} + CI_{n-1}$$

$$CQ_n = CoefQ_n * LUT_{Freqn} + CQ_{n-1}. \quad \text{Equation 3:}$$

The present disclosure further provides a computer readable storage medium having a computer program stored thereon which, when executed by a processor, causes steps in the method for extracting broadband error calibration parameters as described above to be implemented.

It should be noted that the term "comprise", "include" or any variant thereof used herein means to be non-exclusive so that a process, method, item or system including a series of elements includes not only said elements, but also other elements not explicitly listed, or inherent elements of such processes, methods, items or systems. In the absence of more limitations, an element defined by "comprising a . . . " do not exclude the existence of additional identical elements in the process, method, item or system including the element.

The sequence numbers in the present disclosure are for description only and do not represent preferences.

Through the description of the above implementations, those skilled in the art can clearly understand that the method according to the present disclosure may be implemented by means of software plus a general hardware platform. Obviously, it may also be implemented by hardware, but in most cases, the former is preferable. Based on such understanding, the present disclosure or, in other words, a part thereof contributing to the related art, can be embodied in a form of a software product, the software product is stored in a storage medium as described above (such as an ROM/RAM, a disk, or an optical disc) and includes a number of instructions to make a terminal device (which may be a mobile phone, a computer, a server, an air conditioner or a network device, etc.) to execute the method of the present disclosure.

The present disclosure can adaptively match a working bandwidth of the current ultra-wide band system, and perform iterative solution on error parameters of a working area in real time, thereby having the advantages of ultra-wide band, high performance, low power consumption and high flexibility.

By performing sub-band splitting and division through time division in the time domain, the present disclosure can achieve the purpose of extracting the ultra-wide band error calibration parameters by multiple times of time domain division, and can be applicable to an ultra-wide band system, namely, having the advantage of ultra-wide band. In addition, by processing in a time division multiplexing method, the present disclosure reduces the resource overhead of hardware and the power consumption of the ultra-wide band system, namely, has the advantage of low power consumption. Moreover, by increasing the number of sub-band frequency points, reducing sub-band bandwidth, and improving a fitting accuracy of the sub-band errors, a user can notably improve performance of each sub-band error parameter, and thus improve the error calibration performance over the whole bandwidth, namely, the present disclosure has the advantage of high performance. Further, with given hardware, a user can configure the sub-band range and the sub-band bandwidth to adapt to different system bandwidths and different performance requirements without changing the hardware structure, namely, the present disclosure has the advantage of high flexibility.

The above are merely preferred implementations of the present disclosure, and not intended to limit the scope of the present disclosure, and all equivalent structures or equivalent of processes that may be modified from the contents of the present disclosure and the attached drawings, or directly or indirectly applied to other related technical fields, are also included in the scope of the present disclosure.

What is claimed is:

1. A method for extracting broadband error calibration parameters, comprising:
    performing frequency band splitting on link broadband signals of an ultra-wide band system according to a received frequency band index table to generate sub-bands;
    extracting an amplitude error and a phase error of each sub-band; and
    iteratively weighting and accumulating, according to the frequency band index table and a preset broadband weight table, the amplitude error and the phase error of each sub-band one by one to an initial amplitude error compensation parameter and an initial phase error compensation parameter respectively, to synthesize and extract broadband error calibration parameters,
    wherein the performing frequency band splitting on link broadband signals of the ultra-wide band system according to the received frequency band index table to generate sub-bands comprises:
    parsing the received frequency band index table to obtain splitting parameters comprising a splitting range, a splitting step and sub-band frequency points for splitting positioning; and
    determining a splitting position in the splitting range according to the splitting step and the sub-band frequency points, and performing frequency band splitting on each link broadband signal of the ultra-wide band system one by one according to the splitting position to generate the sub-bands.

2. The method for extracting broadband error calibration parameters according to claim 1, further comprising:
    before performing frequency band splitting on link broadband signals of the ultra-wide band system according to the frequency band index table to generate sub-bands, determining a sub-band range in an initialization stage of the ultra-wide band system according to received user-demanded bandwidth and application data rate of the ultra-wide band system;
    determining sub-band frequency points in the sub-band range according to a splitting step length and a splitting range from an external input, to form the frequency band index table;
    determining an angular frequency of each sub-band frequency point according to the application data rate; and
    generating a frequency sampling matrix according to each angular frequency and a compensation parameter order from the external input, and generating the preset broadband weight table based on the frequency sampling matrix.

3. The method for extracting broadband error calibration parameters according to claim 2, wherein
    the determining the sub-band range according to the received user-demanded bandwidth and application data rate of the ultra-wide band system comprises:
    determining the sub-band range based on the following:
    the sub-band range is [−BW/(2*Fs), BW/(2*Fs)], where BW is the user-demanded bandwidth, and Fs is the application data rate.

4. The method for extracting broadband error calibration parameters according to claim 3, wherein
    the frequency band index table comprises sub-band frequency points Freq1, Freq2, . . . , Freqn, and Freq1, Freq2, . . . , Freqn ∈[−BW/(2*Fs), BW/(2*Fs)];
    the determining the angular frequency of each sub-band frequency point according to the application data rate comprises:
    determining the angular frequency of each sub-band frequency point as 2π$t$/Fs, where Fs is the application data rate.

5. The method for extracting broadband error calibration parameters according to claim 4, wherein
    the generating the frequency sampling matrix according to each angular frequency and the compensation parameter order from the external input comprises:
    determining the frequency sampling matrix F according to the following Equation 1:

$$F = \begin{bmatrix} e^{-jw1\frac{M-1}{2}} & e^{-jw1\frac{M-3}{2}} & \cdots & e^{jw1\frac{M-1}{2}} \\ e^{-jw2\frac{M-1}{2}} & e^{-jw2\frac{M-3}{2}} & \cdots & e^{jw2\frac{M-1}{2}} \\ \vdots & \vdots & \ddots & \vdots \\ e^{-jwN\frac{M-1}{2}} & e^{-jwN\frac{M-3}{2}} & \cdots & e^{jwN\frac{M-1}{2}} \end{bmatrix}, \quad \text{Equation 1}$$

where M is the compensation parameter order from the external input, w is the angular frequency of each sub-band frequency point, and j is an imaginary number; and
    the generating the preset broadband weight table based on the frequency sampling matrix comprises:
    generating based on LUT=$(F^H F)^{-1} F^H$, where LUT is the preset broadband weight table, and F is the frequency sampling matrix.

6. The method for extracting broadband error calibration parameters according to claim 1, wherein the extracting the amplitude error and the phase error of each sub-band comprises:

detecting a signal power and an image power of each sub-band one by one, and removing abnormal sub-bands from the sub-bands, so as to obtain valid sub-bands having a signal power greater than a first threshold and an image power less than a second threshold; and calculating an amplitude error and a phase error of each valid sub-band based on a preset algorithm.

7. The method for extracting broadband error calibration parameters according to claim 1, wherein the frequency band index table comprises sub-band frequency points of Freq1, Freq2, ..., Freq$_n$, and Freq1, Freq2, ..., Freq$_n$ ∈[−BW/(2*Fs), BW/(2*Fs)]; where the sub-band range is [−BW/(2*Fs), BW/(2*Fs)], BW is the user-demanded bandwidth, and Fs is the application data rate; and the iteratively weighting and accumulating, according to the frequency band index table and the preset broadband weight table, the amplitude error and the phase error of each sub-band one by one to the initial amplitude error compensation parameter and the initial phase error compensation parameter respectively, to synthesize and extract broadband error calibration parameters, comprises:

obtaining an amplitude error compensation parameter and a phase error compensation parameter for each sub-band based on the following Equation 2:

$$\text{is:} \quad \begin{aligned} CoefI_n &= \tan(Perr_n) \\ CoefQ_n &= \frac{Gerr_n}{\cos(Perr_n)} \end{aligned} \quad \text{Equation 2}$$

where $Gerr_n$ is the amplitude error, $Perr_n$ is the phase error, $CoefI_n$ is the new amplitude error compensation parameter, and $CoefQ_n$ is the new phase error compensation parameter;

weighting the new amplitude error compensation parameter $CoefI_n$ by a weight vector $LUT_{Freqn}$ corresponding to $Freq_n$ in the preset broadband weight table, and accumulating the same to an original amplitude compensation parameter $CI_{n-1}$, where $CI_0$ is the initial amplitude error compensation parameter;

weighting the new phase error compensation parameter $CoefQ_n$ by a weight vector $LUT_{Freqn}$ corresponding to $Freq_n$ in the preset broadband weight table, and accumulating the same to an original phase compensation parameter $CQ_{n-1}$, where $CQ_0$ is the initial phase error compensation parameter; and finally, generating the latest broadband error calibration parameters $CI_n$ and $CQ_n$ based on the following Equation 3, $$CI_n = CoefI_n * LUT_{Freqn} + CI_{n-1}$$

$$CQ_n = CoefQ_n * LUT_{Freqn} + CQ_{n-1}. \quad \text{Equation 3}$$

8. A non-transitory computer-readable storage medium, having a computer program stored thereon which, when executed by a processor, causes steps of the method for extracting broadband error calibration parameters according to claim 1 to be implemented.

9. A device for extracting broadband error calibration parameters, comprising a control module, a frequency band splitting module, a sub-band error extraction module and a broadband parameter synthesis module, wherein the control module comprising a memory, a processor, and a computer program stored on the memory and executable on the processor, and when executed by the processor, the computer program causes the following steps to be implemented:

controlling the frequency band splitting module to perform frequency band splitting on link broadband signals of an ultra-wide band system according to a received frequency band index table to generate sub-bands;

controlling the sub-band error extraction module to extract an amplitude error and a phase error of each sub-band; and controlling the broadband parameter synthesis module to iteratively weight and accumulate, according to the frequency band index table and a preset broadband weight table, the amplitude error and the phase error of each sub-band one by one to an initial amplitude error compensation parameter and an initial phase error compensation parameter respectively, to synthesize broadband error calibration parameters, wherein the computer program, when executed by the processor, further causes following steps to be implemented:

parsing the received frequency band index table to obtain splitting parameters comprising a splitting range, a splitting step and sub-band frequency points for splitting positioning; and determining a splitting position in the splitting range according to the splitting step and the sub-band frequency points, and performing frequency band splitting on each link broadband signal of the ultra-wide band system one by one according to the splitting position to generate the sub-bands.

10. The device for extracting broadband error calibration parameters according to claim 9, wherein when executed by the processor, the computer program causes the following steps to be implemented:

controlling the control module to determine a sub-band range in an initialization stage of the ultra-wide band system according to the received user-demanded bandwidth and application data rate of the ultra-wide band system;

controlling the control module to determine sub-band frequency points in the sub-band range according to a splitting step length and a splitting range from an external input, to form the frequency band index table;

controlling the control module to determine an angular frequency of each sub-band frequency point according to the application data rate; and controlling the control module to generate a frequency sampling matrix according to each angular frequency and a compensation parameter order from the external input, and generate the preset broadband weight table based on the frequency sampling matrix.

11. The device for extracting broadband error calibration parameters according to claim 10, wherein the computer program, when executed by the processor, causes following steps to be implemented:

determining the sub-band range based on the following: the sub-band range is [−BW/(2*Fs), BW/(2*Fs)], where BW is the user-demanded bandwidth, and Fs is the application data rate.

12. The device for extracting broadband error calibration parameters according to claim 11, wherein the frequency band index table comprises sub-band frequency points Freq1, Freq2, ..., Freqn, and Freq1, Freq2, ..., Freqn ∈[−BW/(2*Fs), BW/(2*Fs)], and the computer program, when executed by the processor, causes following steps to be implemented:
- determining the angular frequency of each sub-band frequency point as 2π/Fs, where Fs is the application data rate.

13. The device for extracting broadband error calibration parameters according to claim 12, wherein the computer program, when executed by the processor, causes following steps to be implemented:
- determining the frequency sampling matrix F according to the following Equation 1:

$$F = \begin{bmatrix} e^{-jw1\frac{M-1}{2}} & e^{-jw1\frac{M-3}{2}} & \cdots & e^{jw1\frac{M-1}{2}} \\ e^{-jw2\frac{M-1}{2}} & e^{-jw2\frac{M-3}{2}} & \cdots & e^{jw2\frac{M-1}{2}} \\ \vdots & \vdots & \ddots & \vdots \\ e^{-jwN\frac{M-1}{2}} & e^{-jwN\frac{M-3}{2}} & \cdots & e^{jwN\frac{M-1}{2}} \end{bmatrix}, \quad \text{Equation 1}$$

where M is the compensation parameter order from the external input, w is the angular frequency of each sub-band frequency point, and j is an imaginary number; and
generating the preset broadband weight table based on LUT=$(F^H F)^{-1} F^H$, where LUT is the preset broadband weight table, and F is the frequency sampling matrix.

14. The device for extracting broadband error calibration parameters according to claim 9, wherein the computer program, when executed by the processor, causes following steps to be implemented:
- detecting a signal power and an image power of each sub-band one by one, and removing abnormal sub-bands from the sub-bands, so as to obtain valid sub-bands having a signal power greater than a first threshold and an image power less than a second threshold; and
- calculating an amplitude error and a phase error of each valid sub-band based on a preset algorithm.

15. The device for extracting broadband error calibration parameters according to claim 9, wherein the frequency band index table comprises sub-band frequency points of Freq1, Freq2, . . . , Freq$_n$, and Freq1, Freq2, . . . , Freq$_n$ ∈[−BW/(2*Fs), BW/(2*Fs)]; where the sub-band range is [−BW/(2*Fs), BW/(2*Fs)], BW is the user-demanded bandwidth, and Fs is the application data rate, and the computer program, when executed by the processor, causes following steps to be implemented:
- obtaining an amplitude error compensation parameter and a phase error compensation parameter for each sub-band based on the following Equation 2:

$$\text{is:} \quad \begin{aligned} CoefI_n &= \tan(Perr_n) \\ CoefQ_n &= \frac{Gerr_n}{\cos(Perr_n)} \end{aligned}, \quad \text{Equation 2}$$

where $Gerr_n$ is the amplitude error, $Perr_n$ is the phase error, $CoefI_n$ is the new amplitude error compensation parameter, and $CoefQ_n$ is the new phase error compensation parameter;
weighting the new amplitude error compensation parameter $CoefI_n$ by a weight vector $LUT_{Freqn}$ corresponding to $Freq_n$ in the preset broadband weight table, and accumulating the same to an original amplitude compensation parameter $CI_{n-1}$, where $CI_0$ is the initial amplitude error compensation parameter;
weighting the new phase error compensation parameter $CoefQ_n$ by a weight vector $LUT_{Freqn}$ corresponding to $Freq_n$ in the preset broadband weight table, and accumulating the same to an original phase compensation parameter $CQ_{n-1}$, where $CQ_0$ is the initial phase error compensation parameter; and
finally, generating the latest broadband error calibration parameters $CI_n$ and $CQ_n$ based on the following Equation 3, $$CI_n = CoefI_n * LUT_{Freqn} + CI_{n-1}$$

$$CQ_n = CoefQ_n * LUT_{Freqn} + CQ_{n-1}. \quad \text{Equation 3:}$$

16. A method for extracting broadband error calibration parameters, comprising:
- performing frequency band splitting on link broadband signals of an ultra-wide band system according to a received frequency band index table to generate sub-bands;
- extracting an amplitude error and a phase error of each sub-band; and
- iteratively weighting and accumulating, according to the frequency band index table and a preset broadband weight table, the amplitude error and the phase error of each sub-band one by one to an initial amplitude error compensation parameter and an initial phase error compensation parameter respectively, to synthesize and extract broadband error calibration parameters, wherein the extracting the amplitude error and the phase error of each sub-band comprises:
- detecting a signal power and an image power of each sub-band one by one, and removing abnormal sub-bands from the sub-bands, so as to obtain valid sub-bands having a signal power greater than a first threshold and an image power less than a second threshold; and
- calculating an amplitude error and a phase error of each valid sub-band based on a preset algorithm.

* * * * *

UNITED STATES PATENT AND TRADEMARK OFFICE
CERTIFICATE OF CORRECTION

PATENT NO. : 11,700,034 B2
APPLICATION NO. : 17/294392
DATED : July 11, 2023
INVENTOR(S) : Hongxing Zhou Page 1 of 1

It is certified that error appears in the above-identified patent and that said Letters Patent is hereby corrected as shown below:

In the Claims

Column 16, Line 36, the formula reading -2πt/Fs- should read --"2π/Fs"--

Signed and Sealed this
Third Day of October, 2023

Katherine Kelly Vidal
*Director of the United States Patent and Trademark Office*